United States Patent
Quail (10) Patent No.: US 8,301,270 B2
(45) Date of Patent: Oct. 30, 2012

(54) SYSTEMS AND METHODS FOR FACILITATING HOME AUTOMATION

(75) Inventor: Gavin James Quail, West Yorkshire (GB)

(73) Assignee: Eldon Technology Ltd., Keighley, West Yorkshire (GB)

( * ) Notice: Subject to any disclaimer, the term of this patent is extended or adjusted under 35 U.S.C. 154(b) by 546 days.

(21) Appl. No.: 12/360,669

(22) Filed: Jan. 27, 2009

(65) Prior Publication Data
US 2010/0191352 A1    Jul. 29, 2010

(51) Int. Cl.
*G05B 11/01* (2006.01)
*G08C 19/12* (2006.01)
*H04L 17/02* (2006.01)

(52) U.S. Cl. ............................. 700/17; 341/173; 341/176

(58) Field of Classification Search .................... 700/17; 341/176, 173
See application file for complete search history.

(56) References Cited

U.S. PATENT DOCUMENTS

| | | | |
|---|---|---|---|
| 5,886,732 A * | 3/1999 | Humpleman | 725/49 |
| 6,348,956 B1 * | 2/2002 | Tanigawa et al. | 348/734 |
| 7,039,858 B2 * | 5/2006 | Humpleman et al. | 715/205 |
| 2004/0150546 A1 * | 8/2004 | Choi | 341/176 |
| 2004/0203387 A1 * | 10/2004 | Grannan | 455/41.2 |
| 2007/0112939 A1 * | 5/2007 | Wilson et al. | 709/219 |
| 2007/0185597 A1 * | 8/2007 | Bejean et al. | 700/83 |
| 2009/0184926 A1 * | 7/2009 | Kates | 345/163 |

\* cited by examiner

*Primary Examiner* — Mohammad Ali
*Assistant Examiner* — Sivalingam Sivanesan
(74) *Attorney, Agent, or Firm* — Seed IP Law Group PLLC (57) ABSTRACT

Various embodiments facilitate home automation via a receiving device. In one embodiment, a home device manager is provided for execution on a receiving device, such as a set-top box. The home device manager is configured to discover home devices and to obtain device control information from the discovered devices. The home device manager is further configured to, based on the obtained device control information, present a user interface operable by a user to specify commands for controlling a home device, receive a specified command, and control the home device by transmitting the specified command to the home device. This abstract is provided to comply with rules requiring an abstract, and it is submitted with the intention that it will not be used to interpret or limit the scope or meaning of the claims.

20 Claims, 6 Drawing Sheets

SYSTEMS AND METHODS FOR FACILITATING HOME AUTOMATION

TECHNICAL FIELD

The technical field relates to home automation and more particularly, to apparatus, systems and methods for the management of home devices by a receiving device such as a set-top box, based on device control information received from the home devices.

BRIEF SUMMARY

In one embodiment, a set-top box configured to facilitate home automation is provided. The set-top box includes a home device manager that is configured, when executed, to receive control information from a remote home device configured to control an electromechanical system in a residence; present on a display screen one or more user interface controls based at least in part on the received control information; receive an indication of a selection of one of the user interface controls by a user; and control the remote home device by transmitting a command corresponding to the selected user interface control.

In another embodiment, a method for facilitating home automation is provided. The method includes: receiving an indication of a command for controlling a remote home device; presenting an interface control that corresponds to the command for controlling the remote home device; receiving an indication the interface control has been selected by a user; and transmitting the command corresponding to the selected interface control to control the remote home device.

In another embodiment, a computer-readable medium is provided, the computer-readable medium including contents that enable a set-top box to facilitate home automation, by performing a method similar to the above.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
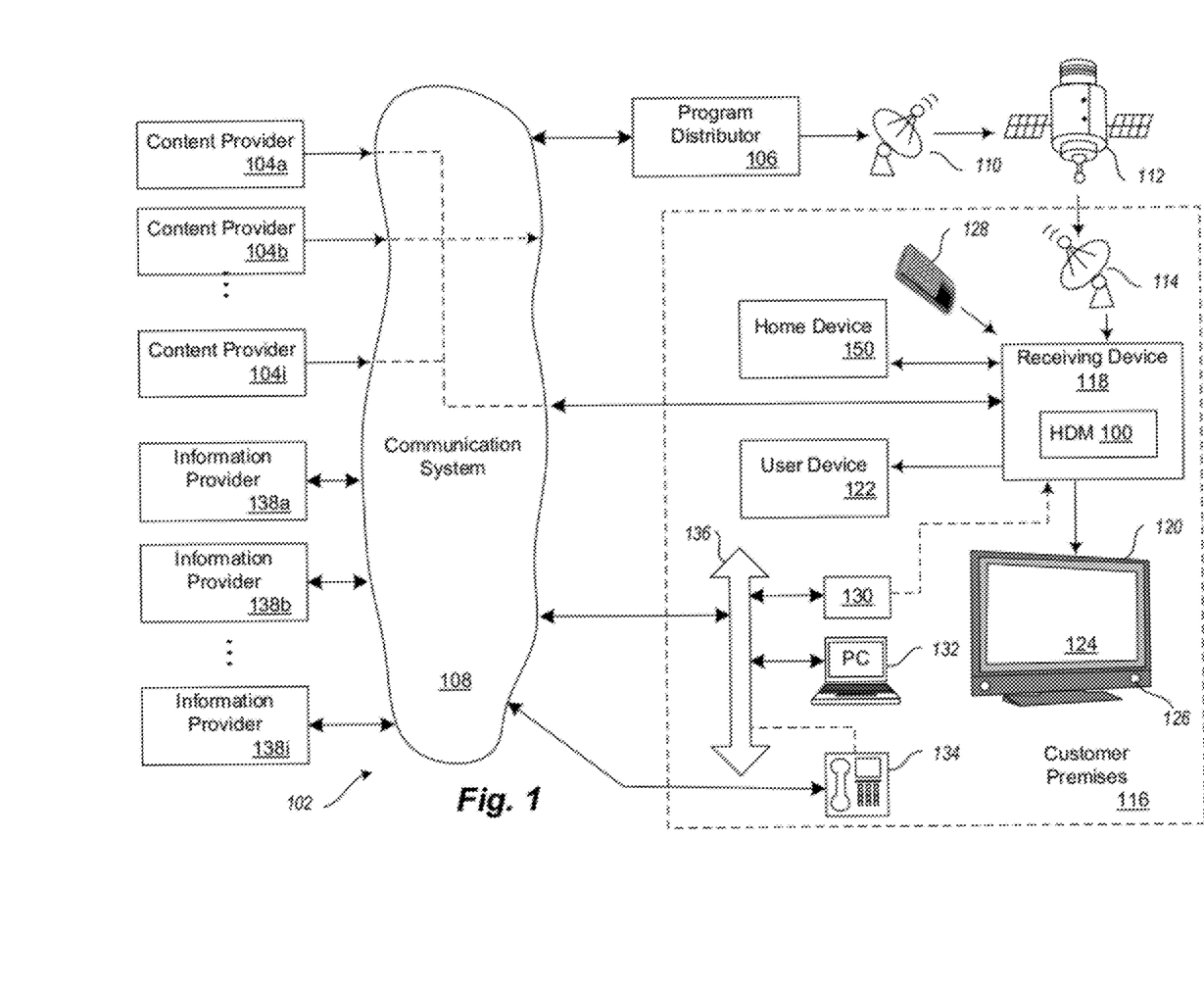
FIG. 1 is a block diagram illustrating an example communication system in which embodiments of a home device manager may be implemented.

FIG. 1 is an overview block diagram illustrating an example communication system 102 in which embodiments of a home device manager 100 may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may remotely located from the customer premises 116. For example, the antenna 114 may be located on the roof of an apartment building, such that the received signals may be transmitted, after possible recoding, via cable or other mechanisms, such as Wi-Fi, to the customer premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote device 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

Embodiments of the Home Device Manager ("HDM") 100 are operable to facilitate home automation by discovering home devices, presenting user interfaces operable to control the discovered home devices, and controlling the discovered home devices based at least in part on inputs received from a user. In the illustrated example, the HDM 100 is communicatively coupled to a home device 150. Home device 150 may include any device operable to interact via some communication mechanism with the HDM 100, in order to receive commands for controlling any electronic, mechanical, or electromechanical apparatus or system installed in or about the customer premises 116. Example home devices include, but are not limited to, control systems for climate (e.g., heating, ventilation, and/or air conditioning), security, lighting, audio/video (e.g., audio players, intercom systems, video players, and the like), pool (e.g., swimming pools, hot tubs, spas, and the like), irrigation (e.g., lawn sprinklers), and kitchen and/or appliances (e.g., ovens, ranges, refrigerators, freezers, washing machines, dryers, and the like).

In one embodiment, the HDM 100 is a component of the receiving device 118. The HDM 100 is configured to discover the home device 150, and to receive device control information from the discovered device 150. Then, the HDM 100 can present, based on the device control information, a user interface on the presentation device 120. The presented user interface is operable by a user to obtain information about the home device 150 and to specify commands for controlling the home device 150. When a user wishes to interact with the home device 150, the user can conveniently control the device 150 by viewing the presented user interface on the presentation device 120, and selecting a command via the remote control 128 or other input mechanism. Then, the HDM 100 receives the selected command and controls the home device 150, based on the device control information. Controlling the home device 150 may include, for example, invoking one or more capabilities of the home device 150 by communicating the selected command to the home device via some communication mechanism, such as home network 136.

The HDM 100 provides mechanisms by which a user can control multiple different home devices via a single, uniform interaction platform provided by the receiving device 118, the presentation device 120, and the remote control 128. Most users are familiar with the operation of the receiving device 118 and/or the presentation device 120 via the remote control 128, and thus may be able to leverage such knowledge to operate home devices via user interfaces provided by the HDM 100. In addition, because multiple different home devices can be controlled via the HDM 100, the user need not travel to other locations in the customer premises 116, such as the basement, garage, kitchen, or the like, in order to control the various home devices. Furthermore, in some embodiments, the customer premises 116 may include multiple presentation devices 120 (connected to one or more HDMs 100), such that the user can access home device management functions from various different locations in the customer premises 118, such as the living room, bedroom, kitchen, bathroom, and the like.

The above description of the communication system 102 and the customer premises 116, and the various devices therein, is intended as a broad, non-limiting overview of an example environment in which various embodiments of a home device manager may be implemented. The communication system 102 and the various devices therein, may contain other devices, systems and/or media not specifically described herein.

Example embodiments described herein provide applications, tools, data structures and other support to implement a home device manager that facilitates home automation. Other embodiments of the described techniques may be used for other purposes, including for discovery and control of remote systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Home Device Manager Overview

Figure 2:
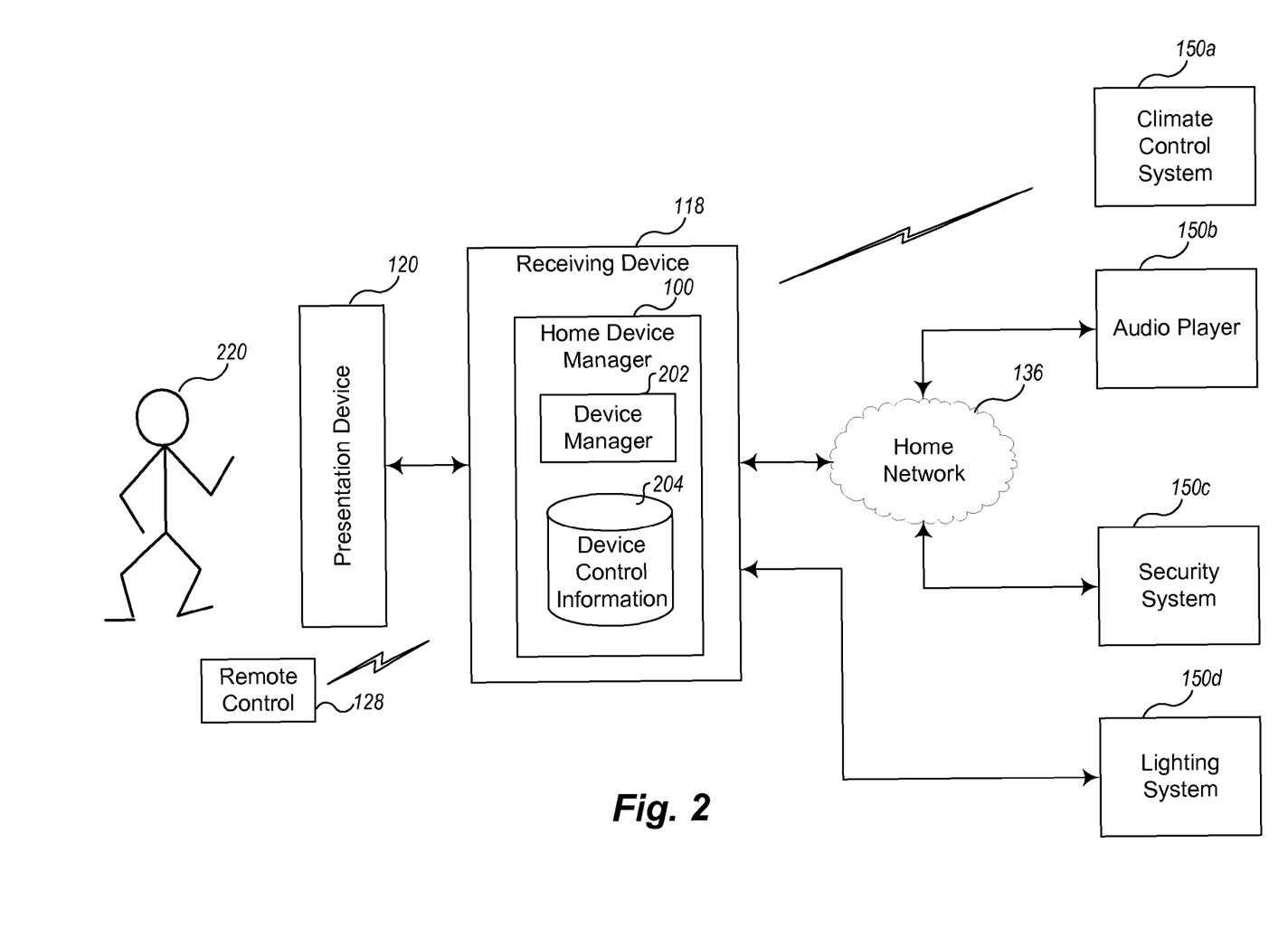
FIG. 2 is a block diagram illustrating example functional elements of an example embodiment.

FIG. 2 is a block diagram illustrating example functional elements of an example embodiment. In particular, FIG. 2 shows an example Home Device Manager ("HDM") 100 executing on a receiving device 118. The illustrated receiving device 118 is communicatively coupled to a plurality of home devices 150*a*-150*d*. The home devices 150*a*-150*d* include a climate control system 150*a*, an audio player 150*b*, a security system 150*c*, and a lighting system 150*d*. Various communication mechanisms are contemplated. For example, the receiving device 118 is wirelessly coupled to the climate control system 150*a*, such as via an infrared link, a wireless Ethernet link, a Bluetooth link, or the like. Furthermore the receiving device 118 is communicatively coupled to the audio player 150*b* and the security system 150*c* via home network 136, as described above with respect to FIG. 1. In addition, the receiving device 118 is directly communicatively coupled to the lighting system 150*d*, such as via an Ethernet connection, a USB ("Universal Serial Bus") connection, a telephone line, a serial line, or the like.

The receiving device 118 is also communicatively coupled to a presentation device 120 and a remote control 128 operable by a user 220. The HDM 100 presents (e.g., displays) interface controls/components, such as user interface controls including windows, buttons, icons, menus, and the like, on the presentation device 120 that correspond to commands for the home devices 150*a*-150*d*. The user 220 initiates these commands by operating the remote control 128 to select or otherwise interact with the appropriate user interface control displayed on the presentation device 120. For example, with respect to the climate control system 202*a*, the HDM 100 may present on the presentation device 120 the current temperature as well as one or more buttons that correspond to various commands for the climate control system 202*a*, such as increasing/decreasing a thermostat setting, setting a climate control schedule, turning on/off a heater or air conditioner, and the like. With respect to the lighting system 202*d*, the HDM 100 may present on the presentation device 120 the state of one or more lights and one or more buttons that correspond to commands for turning on/off lights.

The HDM 100 comprises a device manager 202 and device control information 204. In the illustrated example, the device manager 202 is a code (software) module that performs at least some of the functionality of the HDM 100. The device control information 204 includes code and/or data that specifies control for each of the home devices 150*a*-150*d*. The HDM 100 and its components may be implemented as part of a computing system, as will be further described with reference to FIG. 4, below.

Initially, the device manager 202 receives device control information from each of the home devices 150*a*-150*d*, and stores the received information as home device control information 204. This information may be provided to the device manager 202 in various ways. For example, when a home device is connected to the receiving device 118 for the first time, the device manager may automatically discover the existence of the home device, and request that it provide device control information. Automatic discovery of home devices may be achieved in various ways. In one embodiment, the home device manager 202 from time to time broadcasts (on one or more communication links) a discovery request that asks home devices to provide control information. In another embodiment, a home device initiates an interaction with the device manager 202 in order to provide control information. For example, the home device may initiate such an interaction upon initialization, power-up, and/or on a periodic basis.

The device control information 204 includes code and/or data that specifies control for each of the home devices 150a-150d. In particular, the device control information 204 may include identifiers associated with each of the home devices 150a-150d, such as a human-readable device name, a network identifier, a digital certificate, or the like.

Furthermore, the device control information 204 for a home device specifies one or more commands for invoking capabilities of the home device. These commands may take various forms, such as instruction sequences, method/procedure/function calls, URLs ("Uniform Resource Locators"), or the like. In one embodiment, the device control information 204 for a particular home device includes a mapping (such as a table) mapping between command names and corresponding instruction sequences. To initiate a particular command, the device manager 202 looks up the instruction sequence corresponding to the command in the table, and executes the instruction sequence. Such instruction sequences may be expressed, for example, as binary code configured to execute directly on a processing unit of the receiving device 118, as virtual machine instructions configured to execute on a virtual machine executing on the receiving device 118, as a script configured to be interpreted by an interpreter executing on the receiving device 118, or the like. Typically, the instruction sequence, when executed, will send, via a communication link, control messages and/or data to the remote home device, in accordance with a control protocol for the home device.

In another embodiment, the device control information for a particular home device includes a mapping between command names and corresponding URLs. In such an embodiment, the remote home device executes a Web server configured to operate as an interface to various functions of the home device. A URL for controlling the home device identifies the home device, such as by a network name, and names a resource on the home device that corresponds to a function or capability of the home device. Thus, to initiate a particular command, the device manager 202 looks up the URL corresponding to the command, and "invokes" the URL, such as by performing an HTTP ("Hypertext Transport Protocol") GET or POST based on the URL, including opening an HTTP connection to the Web server executing on the home device, and transmitting a request for a resource specified by the URL. When the Web server executing on the home device receives the resource request, it invokes a corresponding function of the home device.

In addition, the device control information 204 for a home device specifies one or more user interface controls for presentation to the user 220. Each of the specified user interface controls is associated with one or more commands corresponding to the home device. When the user 220 indicates a desire to interact with one of the home devices 150a-150d, the device manager 202 initiates display on the presentation device 120 of the user interface controls corresponding to the home device. Then, when the user selects one of the displayed user interface controls by, for example, making a selection with the remote control 128, the device manager 202 invokes the corresponding command, as described above.

The specification of device commands and user interface controls need not be decoupled, as described above. For example, in one embodiment, each home device 150a-150d provides one or more files including expressions in HTML ("Hypertext Markup Language") or similar language, such as XML ("Extensible Markup Language"). Each file specifies both user interface controls, such as buttons, links, and the like, as well as corresponding device commands, such as via URLs. In such an embodiment, when the user 220 indicates a desire to interact with one of the home devices 150a-150d, the device manager 202 initiates display on the presentation device 120 of the corresponding HTML file, which renders to a form or other user interface element comprising one or more buttons, links, or similar controls. Then, when the user selects one of the displayed controls by pressing a button, the device manager 202 invokes a corresponding command by initiating an HTTP GET from the home device with the appropriate form data, as is known in the art.

The device control information 204 may also include information about the current or past operational state of one or more of the home devices 150a-150d. For example, the device control information 204 may include information such as the current temperature as measured by the climate control system 202a, one or more songs in a song library managed by the audio player 202b, the current volume or other settings of the audio player 202b, the arming status of the security system 202c, the level of various lights managed by the lighting system 202d, and the like.

In at least some embodiments, the device control information 204 includes information (e.g., instructions) for obtaining the current or past operational state information of a home device. For example, the device control information 204 may include a URL for getting the current and/or past temperatures measured by the climate control system 202a. The device manager 202 can query, based on the URL, the climate control system 202a to provide current and/or past operational state information.

In addition, in some embodiments, the HDM 100 provides a mechanism for limiting the types of home devices that may be controlled via the HDM 100. In one embodiment, device control information is digitally signed, such that only device control information that is signed by an appropriate party will be utilized by the HDM 100. For example, the HDM 100 may only display user interface controls specified by device control information that is digitally signed by particular distributors, vendors, or other parties associated with the receiving device 118 and/or the home devices 150a-150d.

The device control information 204 may include other information related to control of and/or interaction with a home device. For example, the device control information 204 may include documentation or other human-readable instructions for operating a home device. In addition, the device control information 204 may include version information, vendor information (e.g., identity of the vendor or distributor of a home device, identity of the vendor or distributor of control information for a home device, and the like), user settings (e.g., usernames, passwords, preference information), control settings (e.g., preferred settings for a particular device), and the like.

C. Example Home Device Manager User Interface

Figure 3A:
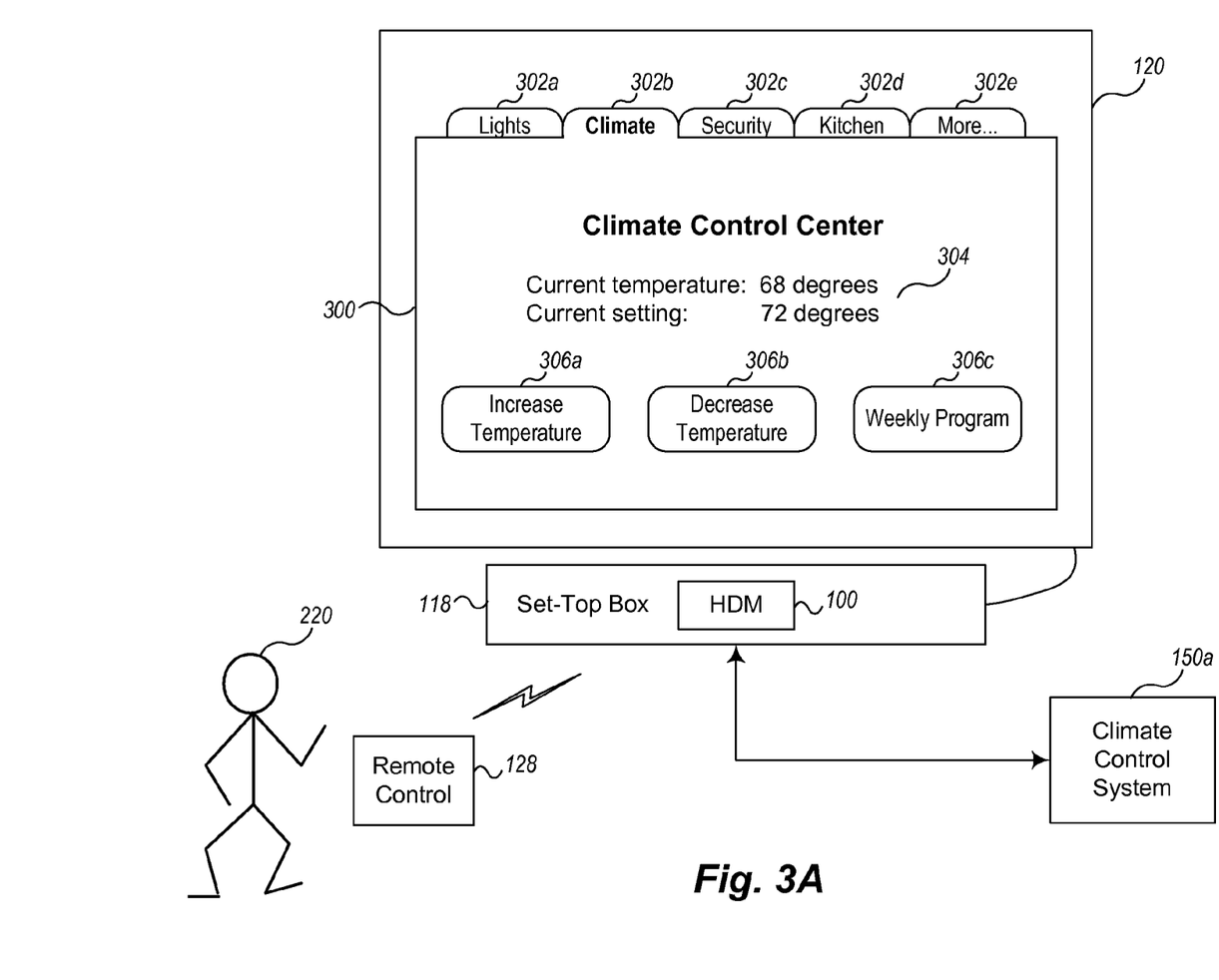
FIGS. 3A-3B are block diagrams illustrating an example user interfaces provided by example embodiments.
Figure 3B:
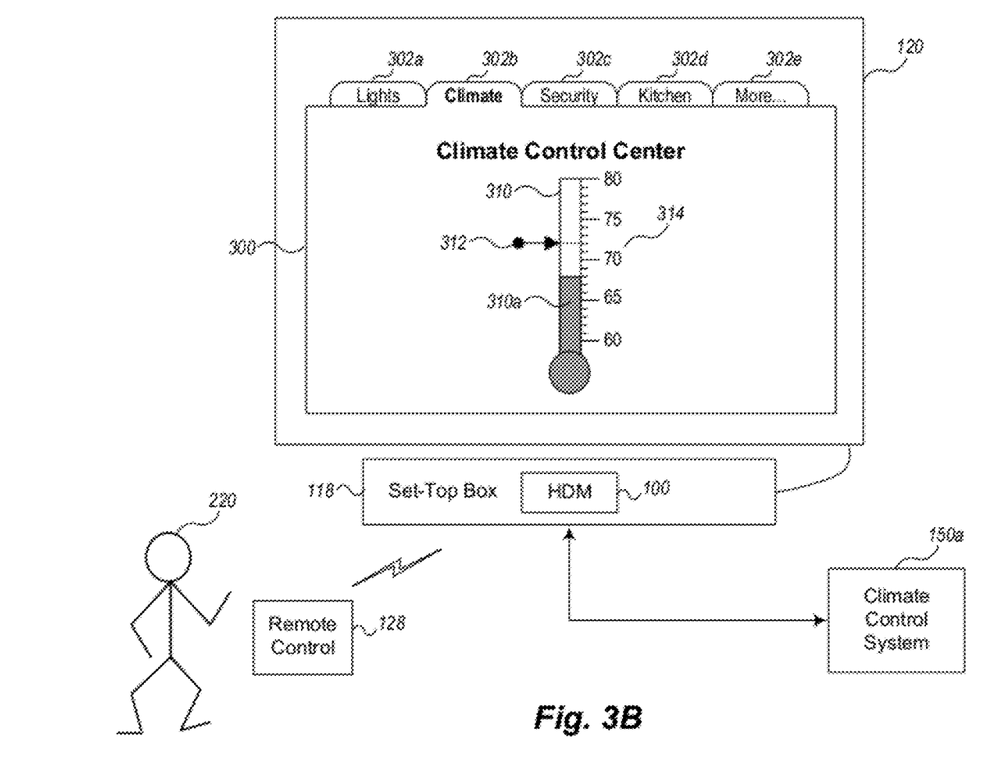

FIGS. 3A-3B are block diagrams illustrating example user interfaces provided by example embodiments. In particular, FIG. 3A shows a receiving device 118 that is communicatively coupled to a presentation device 120, a climate control system 150a, and a remote control 128 operated by a user 220. The receiving device comprises a home device manager 100, which has presented (e.g., displayed), based on device control information, a user interface 300 on the presentation device 120.

The user interface 300 includes multiple tabs 302a-302e. Each tab includes user interface controls for a corresponding home device, as specified by device control information obtained from the home device and/or stored on the receiving device 118. For example, tabs 302a-302d respectively include controls for a lighting system, a climate control system, a security system, and a kitchen control system. Tab 302e includes links to additional home devices, or other controls or information, such as global controls, user preference settings, documentation, etc.

In the example of FIG. 3A, the user 220 has selected, via remote control 128, tab 302b corresponding to the climate control system 150a. In response, the HDM 100 has displayed, based on device control information, tab 302b, which includes current state information 304 and buttons 306a-306c. The current state information 304 displays the current temperature as measured by the climate control system 150a, as well as the preferred thermostat setting of the climate control system 150a. The buttons 306a-306c are selectable by the user 220 to respectively increase the thermostat setting, decrease the thermostat setting, and specify a weekly program for the climate control system 150a.

When the user 220 selects the increase temperature button 306a, the HDM 100 determines, based on device control information stored on the receiving device 118, the corresponding command to increase the thermostat setting by a predetermined amount. The HDM 100 then initiates that command by interacting with the climate control system 150a, such as by transmitting the command over the communication link between the receiving device 118 and the climate control system 150a. Similarly, when the user 220 selects the decrease temperature button 306b, the HDM 100 initiates the corresponding command by interacting with the climate control system 150a via the communication link. In addition, when the user 220 selects the weekly program button 304c, the HDM 100 displays a further user interface screen, based on device control information stored on the receiving device 118, by the HDM 100. This further user interface screen is operable to specify time-of-day, day-of-week, or other scheduled settings for the climate control system 150a.

FIG. 3B illustrates an alternative user interface for operating the climate control system 150a. In particular, tab 302b includes iconic user interface controls that provide information to the user 220 and that may also be directly manipulated by the user 220 in order to invoke one or more capabilities of the climate control system 150a. More specifically, tab 302b includes a thermometer 310, a set temperature indicator 312, and a scale 314. The thermometer, by way of a shaded portion 310a indicates, as shown by scale 314, that the current temperature measured by the climate control system 150a is about 68 degrees. The indicator 312 indicates, as shown by scale 314, that the current temperature setting is about 72 degrees.

Various embodiments may simulate user interfaces that are similar to (e.g., having similar features/functions and/or metaphors) or different from (e.g., having a greater/lesser number of features/functions, different metaphors, etc.) the actual, physical user interfaces provided by the device controlled by the HDM. For example, the climate control system 150a may have a physical user interface similar to that shown in FIG. 3A. That is, the physical user interface of the climate control system 150a may comprise a digital temperature display, such as an LCD display, and one or more buttons to adjust the current temperature setting. However, as shown by the iconic user interface of FIG. 3B, user interface controls presented by the HDM need not mimic or reproduce the actual user interfaces of the devices they control. By providing different types or styles of user interfaces and user interface controls, the HDM may provide support for users of different skill levels and/or capabilities.

D. Example Computing System Implementation

Figure 4:
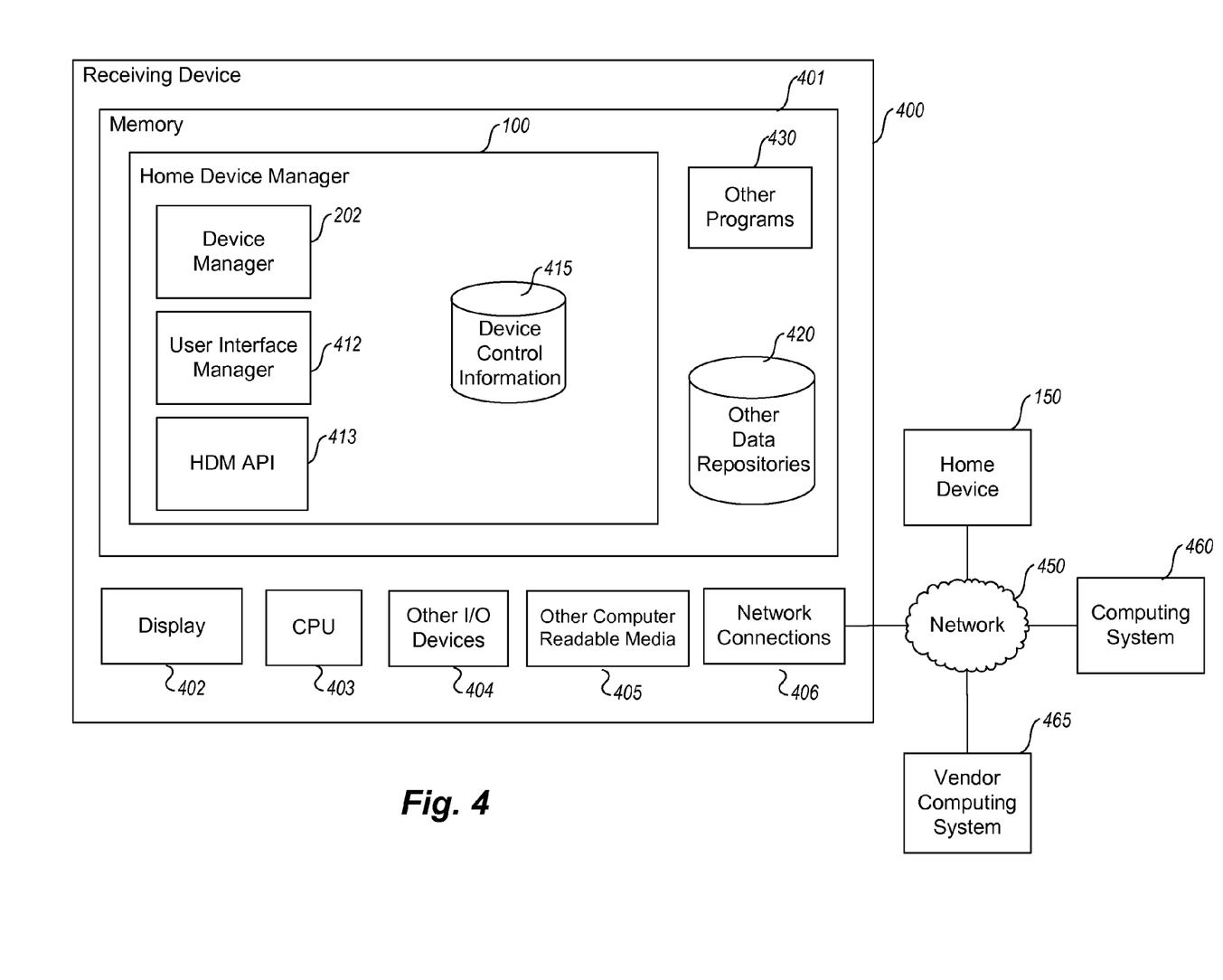
FIG. 4 is a block diagram of a computing system for practicing example embodiments of a home device manager.

FIG. 4 is a block diagram of a computing system for practicing example embodiments of a home device manager. FIG. 4 shows a receiving device computing system 400 that may be utilized to implement a Home Device Manager ("HDM") 100. In one embodiment, the receiving device computing system 400 is part of a set-top box configured to receive and display programming on a presentation device. Note that one or more general purpose or special purpose computing systems/devices may be used to implement the HDM 100. In addition, the computing system 400 may comprise one or more distinct computing systems/devices and may span distributed locations. Furthermore, each block shown may represent one or more such blocks as appropriate to a specific embodiment or may be combined with other blocks. Also, the HDM 100 may be implemented in software, hardware, firmware, or in some combination to achieve the capabilities described herein.

In the embodiment shown, receiving device computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The HDM 100 is shown residing in memory 401. In other embodiments, some portion of the contents, some of, or all of the components of the HDM 100 may be stored on and/or transmitted over the other computer-readable media 405. The components of the HDM 100 preferably execute on one or more CPUs 403 and mange home devices, as described herein. Other code or programs 430 (e.g., an audio/video processing module, a program guide manager module, a Web server, and the like) and potentially other data repositories, such as data repository 420, also reside in the memory 410, and preferably execute on one or more CPUs 403. Of note, one or more of the components in FIG. 4 may not be present in any specific implementation. For example, some embodiments may not provide other computer readable media 405.

In a typical embodiment, the HDM 100 includes a device manager 202, user interface manager 412, a home device manager application program interface ("HDM API") 413, and a data repository 415 that includes device control information. Other and/or different modules may be implemented. The HDM 100 interacts via a network 450 with home device 150, and possibly with a computing system 460 (e.g., a desktop computer, a laptop computer, etc.) and/or a vendor computing system 465.

The device manager 202 performs the core functions of the HDM 100, as discussed with respect to FIGS. 2 and 3, above. In particular, the device manager 202 discovers the existence of the home device 150; receives device control information from the home device 150; stores the received device control information in the data repository 415; interacts with the home device 150 to initiate commands or controls; and the like.

The user interface manager 412 provides a view and a controller that facilitate user interaction with the HDM 100 and its various components. For example, the user interface manager 412 provides, based on device control information, an interactive graphical user interface such as user interface 300 described with respect to FIGS. 3A-3B. As discussed, such a user interface includes controls and operational state information associated corresponding to the home device 150. The user interface manager 412 also receives input from a user (e.g., in the form of user interface events) and translates those inputs into the appropriate command for initiation by the device manager 202.

In at least some embodiments, remote access is provided to at least some of the functionality of the user interface manager 412. For example, the user interface manager 412 may provide access to some of its functionality via a Web server, possibly executing as one of the other programs 430. In one embodiment, a user operating the computing system 460 can access the user interface manager 412 via a Web browser executing on the computing system 460.

The HDM API 413 provides programmatic access to one or more functions of the HDM 100. For example, the HDM API 413 may provide a programmatic interface to one or more device management functions of the HDM 100 that may be invoked by one of the other programs 430 or some other module. In this manner, the HDM API 413 may facilitate the development of third-party software, such as user interfaces, plug-ins, adapters (e.g., for integrating functions of the HDM 100 into desktop applications), and the like.

In addition, the HDM API 413 may be in at least some embodiments invoked or otherwise accessed via remote entities, such as the home device 150, the computing system 460, and/or the vendor computing system 465, to access various device management functionality of the HDM 100. For example, the vendor computing system 465 may access the HDM API 413 to perform various functions, such as upgrading and/or repairing device control information corresponding to home device 150.

The data repository 415 records device control information, such as device control information 204 described with respect to FIG. 2. The device control information may be received from various sources, including the home device 150 itself, the vendor computing system 465, or the other computer-readable media 405. As discussed, such information may include home device identifiers, current and/or past state information corresponding to a home device, instructions for interacting with and/or controlling a home device, documentation related to the use of a home device, etc. The device control information may take various forms, including binary instructions/data, text instructions/data, etc. In at least one embodiment, the device control information includes one or more files that contain expressions in a markup language (e.g., HTML, XML, and the like) for specifying user interface elements, data, instructions, and/or commands for interacting with home devices.

In an example embodiment, components/modules of the HDM 100 are implemented using standard programming techniques. For example, the HDM 100 may be implemented as a "native" executable running on the CPU 403, along with one or more static or dynamic libraries. In other embodiments, the HDM 100 may be implemented as instructions processed by virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an HDM implementation. Also, other functions could be implemented and/or performed by each component/module, and in different orders, and by different components/modules, yet still achieve the functions of the HDM.

In addition, programming interfaces to the data stored as part of the HDM 100, such as in the data repository 415, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 415 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components of the HDM 100 may be implemented or provided in other manners, such as at least partially in firmware and/or hardware, including, but not limited to one ore more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 5:
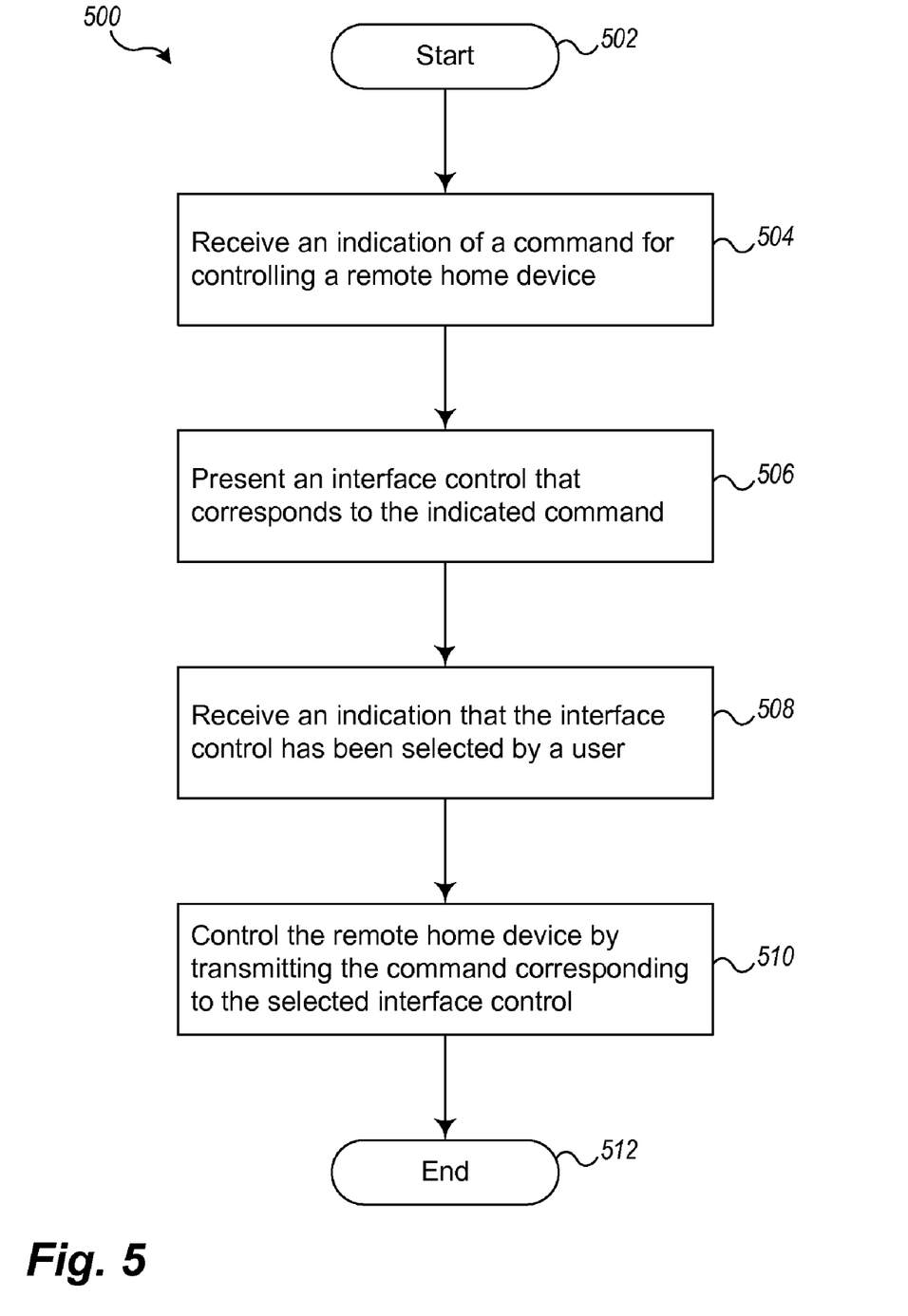
FIG. 5 is a flow diagram of an example home device manager process provided by an example embodiment.

FIG. 5 is a flow diagram of an example home device manager process provided by an example embodiment. In particular, FIG. 5 illustrates process 500 that may be implemented by, for example, one or more modules/components of the HDM 100 executing on the receiving device 118, such as the home device manager 202 and/or the user interface manager 412 described with respect to FIGS. 2 and 4.

The illustrated process 500 starts at 502. At 504, the process receives an indication of a command for controlling a remote home device. Typically, this indication is received from the remote home device, such as by receiving device control information via a home network or other communication mechanism. The received indication may include data and/or instructions that specify how the command is to be invoked. For example, the received indication may include a device identifier, a command/function name, and one or more arguments/parameters that may be included when the command is invoked. In one embodiment, the received indication includes a URL that references the remote home device and names a resource on the home device that corresponds to the command.

At 506, the process presents an interface control/component that corresponds to the indicated command. Presenting the interface control/component may include displaying a user interface control/component, such as a window, form, button, link, checkbox, input field (e.g., a text box), menu, or the like, on a presentation device 120, such as a television, monitor, or other type of display screen. In at least some embodiments, presenting the interface control is based at least in part on device control information received from the remote home device, the device control information including a specification of the interface control. For example, the device control information may include instructions expressed in a markup language, such as HTML or XML, the instruction specifying the interface control and possibly the corresponding command. Then, to display the interface control, the process initiates rendering of the markup instructions on the presentation device.

At 508, the process receives an indication that the interface control has been selected by a user. Receiving the indication that the interface control has been selected may include receiving a user interface input event that identifies the interface control, and possibly includes data associated with the interface control, such as text data typed into a text field, a button value, etc. Typically, the user selects the interface control by operation of a remote control device 128 or other input device (e.g., mouse, keyboard, etc.) that is communicatively coupled to the receiving device 118.

At 510, the process controls the remote home device by transmitting the command corresponding to the selected interface control. Transmitting the command may include opening a network connection and communicating with the remote home device using a suitable protocol, such as by sending a command name along with zero or more arguments/parameters over the network connection and awaiting a response from the remote home device. When the received indication of a command includes a URL, transmitting the command includes opening an HTTP connection to the remote home device and performing a suitable protocol method (e.g., GET, POST, etc.) with respect to the resource named in the URL.

At 512, the process ends. In other embodiments, the process may instead continue to one of steps 504, 506, or 508, in order to present other user interface controls and/or handle additional user input events.

Some embodiments perform one or more operations/aspects in addition to the ones described with respect to process 500. For example, in one embodiment, process 500 performs a device discovery operation, in which it broadcasts a query requesting that connected remote home devices identify themselves and/or provide device control information.

While various embodiments have been described hereinabove, it is to be appreciated that various changes in form and detail may be made without departing from the spirit and scope of the invention(s) presently or hereafter claimed.

The invention claimed is:

1. A set-top box configured to facilitate home automation, the set-top box comprising:
  a memory;
  a home device manager of the set top box, the set-top box configured to receive television programming, the home device manager stored on the memory and that is configured, when executed, to:
    receive control information from a remote home device configured to control an electro-mechanical system in a residence, the control information including an identifier of the remote home device, a specification of one or more commands for invoking capabilities of the remote home device, and a specification of one or more user interface controls that each correspond to one of the one or more commands;
    output at least one of the one or more user interface controls for presentation by a display screen communicatively coupled to the set-top box;
    receive, via a remote control input device communicatively coupled to the set-top box, an indication that the presented user interface control has been selected by a user; and
    control the remote home device by transmitting the command corresponding to the selected user interface control.

2. The set-top box of claim 1 wherein the remote home device is at least one of a climate control system, a security system, a home lighting controller, a kitchen appliance, a swimming pool controller, a spa controller, and an irrigation system.

3. The set-top box of claim 1 wherein the control information includes instructions for presenting the one or more user interface components and instructions for controlling the remote home device, and wherein the home device manager is further configured, when executed, to:
  present the at least one user interface component by processing at least some of the instructions for presenting the one or more user interface components; and
  control the remote home device by processing at least some of the instructions for controlling the remote home device.

4. A method in a set-top box for facilitating home automation, the method comprising:
  under control of the set-top box, wherein the set-top box is configured to receive television programming:
    receiving a command for controlling a remote home device;
    output an interface control that corresponds to the command for controlling the remote home device for presentation by a display screen communicatively coupled to the set-top box;
    receiving, via a remote control input device communicatively coupled to the set-top box, an indication that the interface control has been selected by a user; and
    transmitting the command corresponding to the selected interface control to control the remote home device.

5. The method of claim 4 further comprising:
  receiving an identifier of the remote home device; and
  receiving a specification of one or more commands for invoking capabilities of the remote home device.

6. The method of claim 5 wherein the identifier and the specification of the one or more commands are received from the remote home device, and wherein the indicated command is one of the one or more commands.

7. The method of claim 4 further comprising:
receiving a specification of one or more interface controls that each correspond to a command for controlling the remote home device.

8. The method of claim 7 wherein the specification of the one or more interface controls is received from the remote home device, and wherein the presented interface control is one of the one or more interface controls.

9. The method of claim 4 further comprising receiving device control information from the remote home device, the device control information including an identifier of the remote home device, a specification of one or more commands for invoking capabilities of the remote home device, and a specification of one or more interface controls that each correspond to one of the one or more commands.

10. The method of claim 4 wherein the remote home device is at least one of a climate control system, a security system, a home lighting controller, an audio player, a video player, a kitchen appliance, a swimming pool controller, a spa controller, and an irrigation system.

11. The method of claim 4 wherein receiving the command includes receiving a uniform resource locator that references the remote home device, and wherein transmitting the command corresponding to the selected interface control includes connecting, based on the uniform resource locator, to the remote home device and transmitting the command over the connection.

12. The method of claim 4 wherein presenting the interface control includes presenting current state information for the remote home device.

13. A non-transitory computer-readable storage medium whose contents enable a receiving device to facilitate home automation, by performing a method comprising:
determining a command for invoking a capability of a home device, wherein determining the command includes:
receiving from the home device a specification of one or more commands for invoking capabilities of the home device;
receiving from the home device a specification of one or more interface components that each correspond to one of the one or more commands;
outputting an interface component that corresponds to the determined command for presentation by a display screen communicatively coupled to the receiving device;
receiving, via a remote control input device communicatively coupled to the receiving device, an indication that the presented interface component has been selected; and
transmitting the determined command to the home device.

14. The computer-readable storage medium of claim 13 wherein outputting the interface component includes displaying, based on the received specification of one or more interface components, the interface component on the display screen.

15. The computer-readable storage medium of claim 13 wherein the method further comprises:
when the home device is initialized, discovering the home device and receiving device control information from the home device, the device control information including a specification of the determined command.

16. The computer-readable storage medium of claim 13 wherein the method further comprises:
querying the home device to obtain operational state information about the device; and
presenting the obtained operational state information.

17. The computer-readable storage medium of claim 13 wherein presenting the interface component includes displaying at least one of a button, a link, a menu, a text box, and a check box.

18. The computer-readable storage medium of claim 13 wherein presenting the interface component includes simulating one or more physical interface controls of the home device.

19. The computer-readable storage medium of claim 13 wherein the computer-readable storage medium is a memory in the receiving device, and wherein the contents are instructions that when executed cause the set-top box to perform the method.

20. The computer-readable storage medium of claim 13 wherein the home device controls one or more electro-mechanical systems in a residence.

* * * * *